No. 718,324. PATENTED JAN. 13, 1903.
E. DEVLIN.
MEANS FOR LOCKING THE STEERING MECHANISM OF MOTOR VEHICLES.
APPLICATION FILED SEPT. 18, 1902.
NO MODEL. 2 SHEETS—SHEET 2.
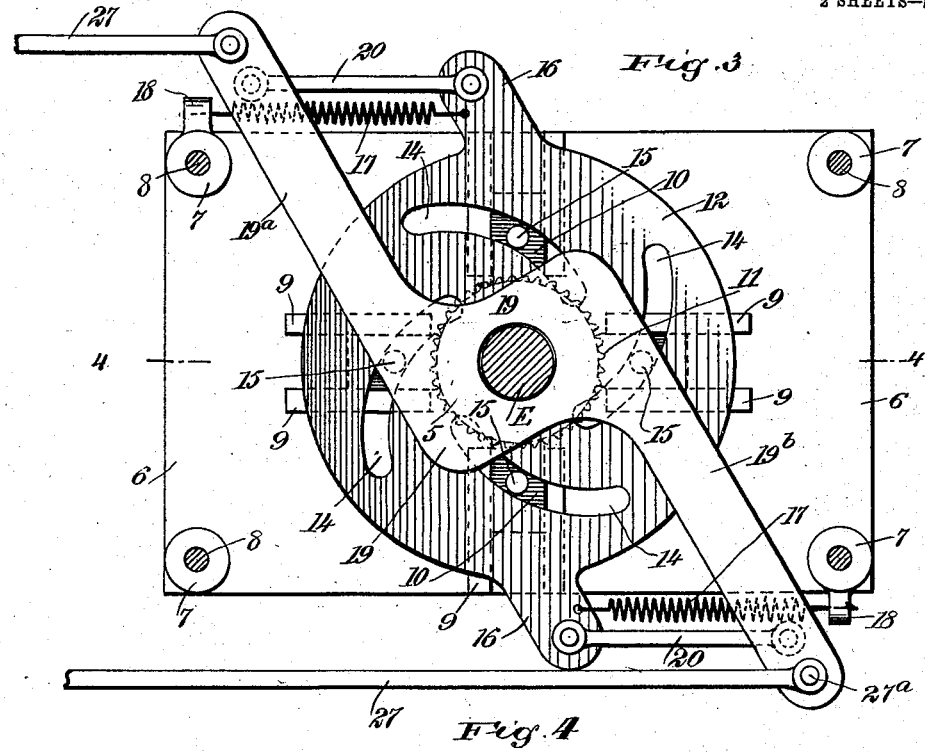
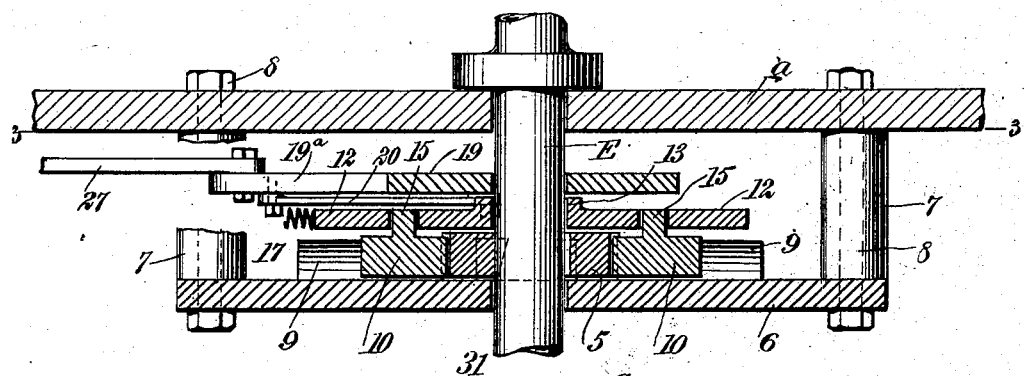
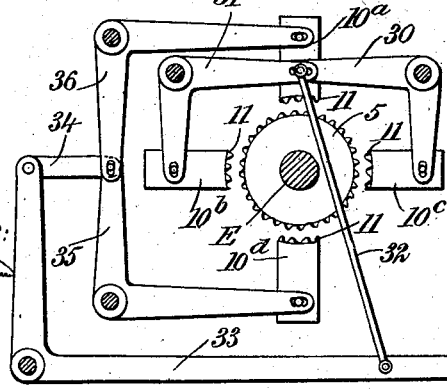
WITNESSES:
INVENTOR
Edward Devlin
BY
ATTORNEYS.

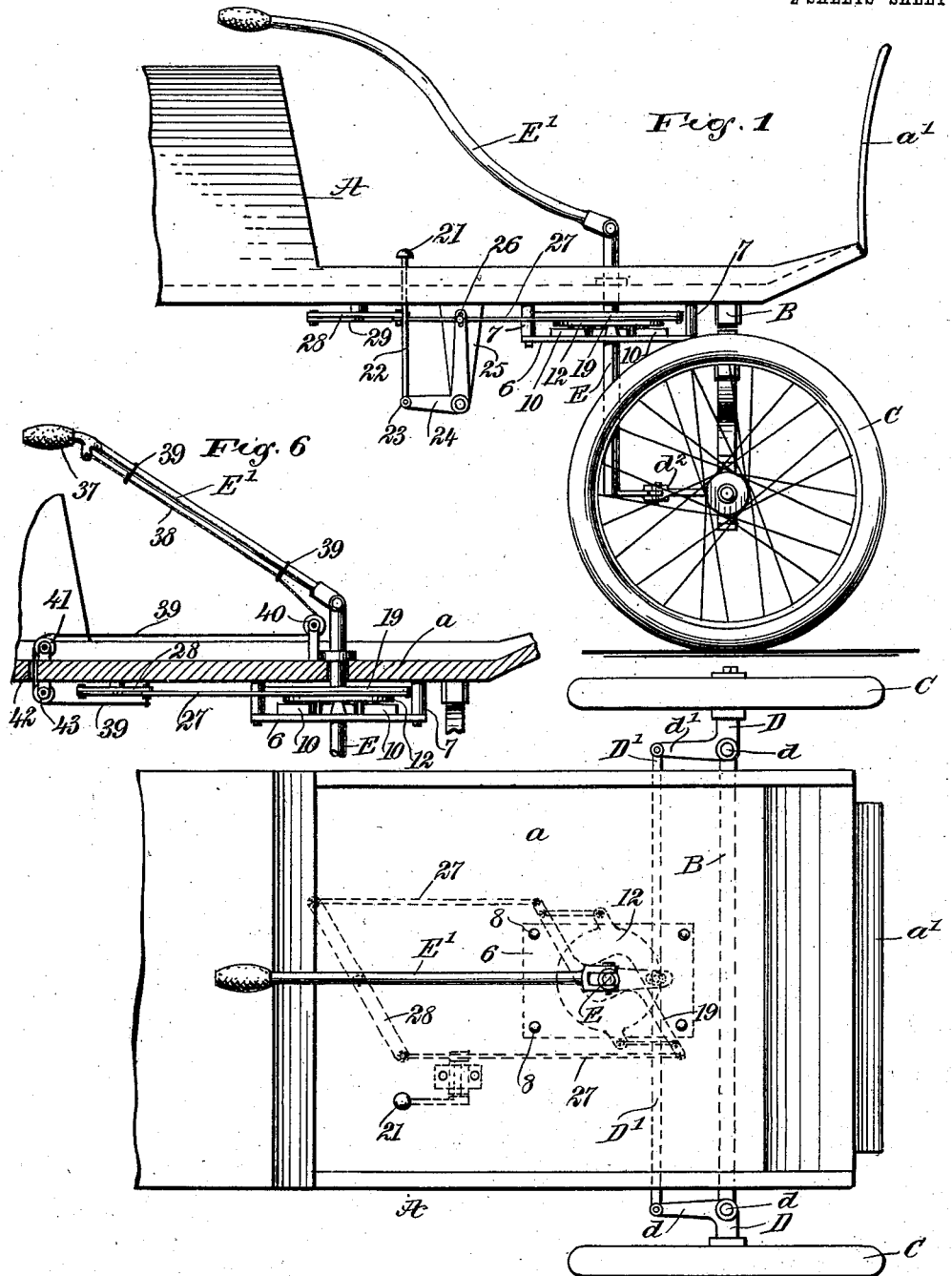

UNITED STATES PATENT OFFICE.

EDWARD DEVLIN, OF PATERSON, NEW JERSEY.

MEANS FOR LOCKING THE STEERING MECHANISM OF MOTOR-VEHICLES.

SPECIFICATION forming part of Letters Patent No. 718,324, dated January 13, 1903.

Application filed September 18, 1902. Serial No. 123,864. (No model.)

*To all whom it may concern:*

Be it known that I, EDWARD DEVLIN, a citizen of the United States, and a resident of Paterson, in the county of Passaic and State of New Jersey, have invented new and useful Improvements in Means for Locking the Steering-Gear of Motor-Driven Vehicles, of which the following is a full, clear, and exact description.
My invention relates to improvements in means for locking the steering-gear of motor-driven vehicles of any and all kinds, and this invention is adapted for use in connection with the steering-gear of such vehicles as automobiles, locomobiles, and wagons or carriages of any description used for pleasure or business purposes and which may be propelled by electrical energy, steam, gas, gasolene, naphtha, or any other agent or motive power.

The essentially new feature of the invention is a device for locking and holding with positive assurance the steering-gear against turning accidentally, said locking device being independent of the steering-gear and being also controllable or actuated separately therefrom. Said locking device serves to positively hold the vehicle on a given course when traveling at a high rate of speed, thus relieving the driver of the necessity of constantly holding the steering-handle, and thereby overcome the fatigue due to the constant jar and vibration. The device is adapted to be set for turning the vehicle in as small a circle as it is possible to turn a machine of its size, and said device prevents the machine from suddenly turning or swerving out of its course when a wheel runs over a small obstruction, such as a brick or stone, which in ordinary machines is sufficient to knock the steering-handle out of the grasp of the operator and cause the front axle to turn, so that the machine is liable to run into a curb or against other obstructions. In the event of deflation of a pneumatic tire by puncture or by cutting the machine equipped with my device retains its course until the driver has an opportunity to release the lock and change the steering device to compensate for the change in the course, and the locking device is capable of instantaneous operation—as, for example, by foot-pressure—so that the vehicle can be steered with ease and facility by the ordinary devices.

Further objects and advantages of the invention will appear from the subjoined description, and the novelty of parts will be defined by the annexed claims.

Reference is to be had to the accompanying drawings, forming a part of this specification, in which similar characters of reference indicate corresponding parts in all the figures.

Figure 1 is a side elevation of a portion of a motor-driven vehicle having a common type of steering-gear and equipped with a locking device of my invention. Fig. 2 is a plan view of the same, showing parts of my locking mechanism by dotted lines. Fig. 3 is a plan view, on an enlarged scale, of my steering-gear-locking mechanism, the steering-spindle being shown in horizontal section and the plane of the section being indicated by the dotted line 3 3 of Fig. 4. Fig. 4 is a vertical longitudinal section on the line 4 4 of Fig. 3. Fig. 5 is a diagrammatic plan view illustrating another embodiment of the invention; and Fig. 6 is a vertical sectional elevation through a portion of the vehicle and its steering-gear, showing another embodiment of means for operating the locking mechanism of this invention.

A designates a portion of the body of any suitable kind of motor-driven vehicle, said body being provided at its front end with a dashboard $a'$. The front end of this body is mounted on an axle B, adapted to support the front wheels C. I have shown this vehicle equipped with means for changing the position of the front wheels C, said means having the shiftable stub-axles D, which are pivoted at $d$ to the axle B and provided with crank-arms $d'$, operatively connected together by a link or rod D', the latter being provided with an arm $d^2$, to which is connected the lower extremity of a steering-spindle E. This spindle is adapted to be shifted by a suitable handle E', which is disposed above the bottom of the vehicle-body A and lies within convenient reach of the driver. I do not desire, however, to limit myself to the employment of any particular style of stub-axles and the means for shifting the same simultaneously, because I am aware that other forms of steering-gear may be employed—as, for example, the steering-spindle may be arranged to turn a pivoted axle, such as B, in order to simultaneously adjust the front wheels. I would therefore have it understood that my invention may be used in connection with the spindle of any kind of steering-gear employed on motor-driven vehicles, and my improvements are intimately associated or combined with this steering-spindle for the purpose of holding the steering-gear from accidental movement.

One part of my improved locking device is a wheel or disk 5, which is made fast with the steering-spindle, so as to turn therewith. This wheel or disk is preferably embodied in the form of a gear-wheel, which is made fast to the vertical spindle E by any suitable means. One means which may be employed for this purpose is a key or gib adapted to fit into a longitudinal keyway that is formed in the spindle and a similar keyway formed in the hub of the gear 5. This gear and the parts comprising the locking mechanism of the invention are disposed below the bottom of the vehicle-body A, and certain parts of the locking mechanism are supported or contained on a frame, plate, or casing 6. In the drawings this frame is shown in the form of a flat plate arranged in a horizontal position below the bottom $a$ of the vehicle-body, and this plate is preferably cast in a single piece of suitable metal with the upstanding posts 7, one of which is disposed at each corner of the plate, as shown by Fig. 3. These posts bear solidly against the under side of the vehicle-body A or against a metallic plate which may be placed against said bottom, and through the plate 6 and the hollow posts 7 pass the long bolts 8, which are adapted to securely fasten the plate 6 to the bottom in a position parallel therewith. The plate is provided on its upper side with a series of parallel flanges which form guideways 9, that are disposed outside of the gear 5 and in positions radially thereto, and in one form of this invention I contemplate the employment of four radial guideways which lie equidistant from each other. The flanges forming the guideways are integral with the plate 6, and each pair of flanges are beveled reversely on their opposing faces, so as to produce a guideway which is dovetailed in cross-section. The number of guideways which I employ is not material, because I may use one, two, or more of these guideways; but the guideways correspond in number to the series of locking-dogs 10. A group of these locking-dogs is disposed in the guideways and around the gear 5, and said dogs are slidably fitted in the guideways, so as to be capable of moving radially with respect to the gear. Each dog consists of a metallic body which is dovetailed in cross-section to fit snugly in the guideway, and these dogs are slidable in the series of guideways, and they lie in the horizontal or transverse plane of the gear, which is fast with the steering-spindle E, the latter passing through a suitable opening in the bottom A of the vehicle-body. (See Fig. 4.) Each dog 10 of the group or series is provided at its inner end with a series of teeth, (indicated by dotted lines at 11 in Fig. 2,) and the toothed ends of the dogs are adapted to have engagement with the teeth of the gear 5, whereby the gear may be held against rotation by a number of dogs, which engage at a number of points therewith, thus providing a secure and efficient means for locking the gear and the spindle against rotary movement.

Another feature of my invention resides in means for simultaneously actuating the group or series of locking-dogs, and this means in one embodiment of the invention resides in a cam-slotted actuating plate or disk 12. This plate or disk occupies a horizontal position directly over the gear 5 and the group of dogs, and said plate is provided with a central opening 13, through which loosely passes the spindle E, thus mounting the actuating plate or disk in a manner to turn freely on the spindle and with respect to the group of dogs. This actuating disk or plate is provided with a series of eccentrically-curved slots 14, in which are loosely fitted the upstanding studs 15 of the dogs 10, one stud being made integral with each dog, as shown by Fig. 4. The disk or plate 12 is provided on opposite sides with the short outwardly-extending arm 16, to which are fastened suitable springs 17, having their opposite ends attached to lugs 18, which are preferably integral with two of the posts 7, that are disposed at diagonally opposite corners of the plate 6. The springs 17 normally draw or turn the plate 12 to a position wherein it will force the group of dogs inwardly toward the spindle E, and thereby keep said dogs in locking engagement with the gear 5, whereby the mechanism is effective in locking the spindle against rotary movement. I do not desire, however, to limit myself to the specific form and arrangement of springs herein described, because I am aware that a single spring may be used and that a spring of another type may be operatively combined with the disk in order to manipulate the same in one direction.

19 designates the retracting-lever, having arms 19$^a$ and 19$^b$, extending in opposite directions from the middle portion of said lever. This lever is arranged in a horizontal position directly above the actuating plate or disk 12, and said lever is provided with a large central opening adapted to loosely receive the steering-spindle E, whereby the lever is loosely mounted on the spindle, which serves as an axis of motion of the lever. The arms 19$^a$ 19$^b$ extend across the actuating-disk and the plate 6, and said arms are connected operatively with the disk by links 20, which are disposed on opposite sides of the spindle, each link being pivoted at one end to a lever-arm and at its other end to an arm 16 of the actuating-disk. (See Fig. 3.) The lever is operatively connected with the disk or plate on opposite sides of the axes of motion of the parts, and said lever shifts or turns the disk 12 uniformly and regularly, so as to overcome lost motion.

With the retracting-lever 19 is connected a foot or pressure piece 21, that is disposed above the bottom of the vehicle-body in a position convenient to the foot of the driver. (See Figs. 1 and 2.) This foot-piece is mounted on the upper end of a vertical stem 22, which passes through the vehicle-body, and the lower end of this stem is pivoted at 23 to the horizontal arm of a bell-crank lever 24, the latter being fulcrumed to a suitable hanger 25, attached to the under side of the vehicle-body. The upright arm of this bell-crank lever is loosely connected at 26 to one of a pair of horizontal operating-rods 27, the forward end of each rod being pivoted at $27^a$ to one arm $19^b$ of the retracting-lever. (See Fig. 3.) The rear ends of the operating-rods 27 are pivoted to an equalizer-lever 28, which is fulcrumed on another hanger 29, secured to the under side of the vehicle-body, as shown in Fig. 1.

From the foregoing description, taken in connection with the drawings, it will be seen that the springs 17 hold the cam-slotted disk in position to force the group of locking-dogs into engagement with the gear 5, and thereby prevent the steering-spindle from turning, thus locking the steering-gear against accidental movement and causing the machine to travel in a given course. It is not necessary for the driver to constantly hold the handle E', because the locking device will prevent accidental change of course of the vehicle should one of the wheels strike a stone or other obstruction or if the tire become punctured or deflated. To release the locking devices and enable the operator to turn the spindle by shifting the position of the handle, it is only necessary for the driver to press downwardly on the foot-piece 21. This operation depresses the stem 22, turns the lever 24, and pulls backwardly on the rod 27, said rod turning the lever 19 and the disk or plate 12 against the tension of the springs 17, whereby the cam-slotted portion of said disk or plate will ride against the studs 15 and move the dogs 10 simultaneously in the guideways, said dogs being thus freed from interlocking engagement with the wheel or gear 5. When the pressure is removed from the foot-piece, the springs 17 become active in returning the parts to their former positions and the group of dogs are simultaneously forced into locking engagement with the gear 5.

The means for simultaneously withdrawing the group of dogs may be modified, and in Fig. 5 I have shown a series of bell-crank levers adapted to actuate said dogs. 30 31 designate two bell-crank levers which are loosely connected at their inner ends to one dog $10^a$ of the group, and the other ends of these levers are connected in a similar way to the dogs $10^b$ $10^c$ of the group. A rod 32 is connected with the levers 30 31 at the point where they are attached to the dog $10^a$, and the other end of this rod is pivoted to an actuating bell-crank lever 33, the long arm of which is operable by the rod or bar 27, adapted to be shifted by movements of the foot-piece 21. The short arm of this actuating bell-crank lever is connected by a link 34 to the arms of other bell-crank levers 35 36, and the lever 35 is connected with the remaining dog $10^d$ of the group, while the lever 36 is operatively connected with the dog $10^a$. The movement of the lever 33 in one direction serves to actuate the levers 35 36 simultaneously and impel the dogs 10 $10^d$ inwardly toward the gear 5 and simultaneously with the movement of the levers 35 36 and the dogs $10^a$ $10^b$. The levers 30 31 are actuated by the rod 32 so as to impel the dogs $10^b$ and $10^c$ inwardly into engagement with the gear, whereby the entire group of dogs may be withdrawn from interlocking engagement with the gear. It is evident that a spring or springs may be combined with one or more of the levers comprising the group to normally hold the dogs into engagement with the gear.

In lieu of the foot-piece and the train of connection with the rod 27 I may employ hand actuating means mounted on the steering-handle E'. This means for withdrawing the locking-dogs contemplates the employment of a hand-lever 37, which is pivotally mounted on the steering-handle, and to this lever is connected the upper part of a cable, cord, or chain 38, which passes through suitable guides 39, attached to said handle, as shown by Fig. 6. This flexible connection passes under a guide-sheave 40 and over a guide-sheave 41, attached to and extending above the bottom of the vehicle-body, and from the sheave 41 the flexible connection passes through a suitable opening 42 in the bottom $a$, so as to extend beneath a guide-sheave 43, which is suspended from the under side of the bottom $a$ of the body, the free end of said flexible connection being attached in any suitable way to the rod or bar 27. It is evident that the lever 37 may be pressed to strain or draw on the flexible connection 38, which is adapted to pull the rod or bar 27 in one direction, and this rod or bar actuates suitable mechanism to simultaneously withdraw the series of dogs from locking engagement with the spindle. I may also employ the lever 37 and its connections with the bar and the foot-piece 21, having operative connection with the bar 27, thus providing manual and pedal means for operating the retracting devices. One of these parts is adapted for use in case the other part gets out of order.

The use of a gib between the spindle E and the locking-gear allows a limited vertical play of the spindle relatively to the gear, because the gib will travel in the key-seat of the spindle.

Having thus described my invention, I claim as new and desire to secure by Letters Patent—

1. In a steering-gear for motor-vehicles, the combination of a locking member, a steering-spindle slidable through the locking member and connected therewith for both parts to turn together at all times, a movable locking member arranged for engagement with said turnable locking member, and means for controlling said movable locking member.

2. In a steering-gear for motor-vehicles, the combination with a steering-spindle, of a locking-disk on said spindle to turn therewith, a stationary support, a locking-dog slidably fitted on the support to have interlocking engagement with said disk, and means for controlling the dog.

3. In a steering-gear for motor-vehicles, the combination with a steering-spindle, of a locking-disk on said spindle to turn therewith, a stationary support, a group of locking-dogs on said support and arranged to engage with said disk, and means for simultaneously withdrawing the dogs of the group from engagement with said disk.

4. In a steering-gear for motor-vehicles, the combination with a vehicle-floor, and a steering-spindle, of a stationary support suspended below the floor, a locking member on said spindle to turn therewith, a group of dogs mounted on the support and normally engaging with the locking member, and means for simultaneously withdrawing all the dogs of the group from the locking member.

5. In a motor-driven vehicle, the combination with a steering-spindle, of a toothed locking member on said spindle to turn therewith, a stationary support, a group of toothed dogs carried by said support and normally having interlocking engagement with said member, a spring-controlled member connected with said dogs for simultaneously withdrawing them from engagement with the locking member, and means for actuating said spring-controlled member.

6. In a motor-driven vehicle, the combination with a steering-spindle, of a locking member mounted on said spindle to turn therewith, a stationary support, a group of radially-movable locking-dogs slidably fitted on the support and normally held in engagement with said locking member, and means for simultaneously withdrawing all the dogs in the group from engagement with said member.

7. In a motor-driven vehicle, the combination with a steering-gear, of a frame or plate having radial guideways, a locking element fast with a member of the steering-gear, a group of slidable toothed dogs confined in said guideways, means for impelling said dogs into engagement with the locking element, and means for simultaneously withdrawing the dogs from said locking element.

8. In a motor-driven vehicle, the combination with a steering-gear, of a locking element fast with the member of said gear, a group of locking-dogs normally engaging with said locking element, a cam-slotted releasing device engaging with all of said dogs of the group, and means for turning said cam-slotted releasing device to simultaneously withdraw the dogs.

9. In a motor-driven vehicle, the combination with a steering-spindle, of a locking-gear fast therewith, a group of dogs normally engaging with said locking-gear, a cam-slotted plate connected with said dogs, a lever linked to said plate, a spring arranged to normally hold the plate in one position, and means for actuating said lever.

10. In a motor-driven vehicle, the combination with a steering-spindle, of a locking element, a group of dogs, a cam-slotted plate connected with said dogs, a lever linked to said plate, a foot-piece, and operative connection between said foot-piece and said lever.

11. In a motor-driven vehicle, the combination with a steering-spindle, of a locking member, locking-dogs normally engaging with said member to hold the spindle against turning, a spring-controlled retracting device connected with said dogs, a rod or bar engaging with said retracting device, and an operating device connected with said rod or bar.

In testimony whereof I have signed my name to this specification in the presence of two subscribing witnesses.

EDWARD DEVLIN.

Witnesses:
 JAMES W. RAFFERTY,
 WILLIAM RAFFERTY.